Patented Mar. 18, 1924.

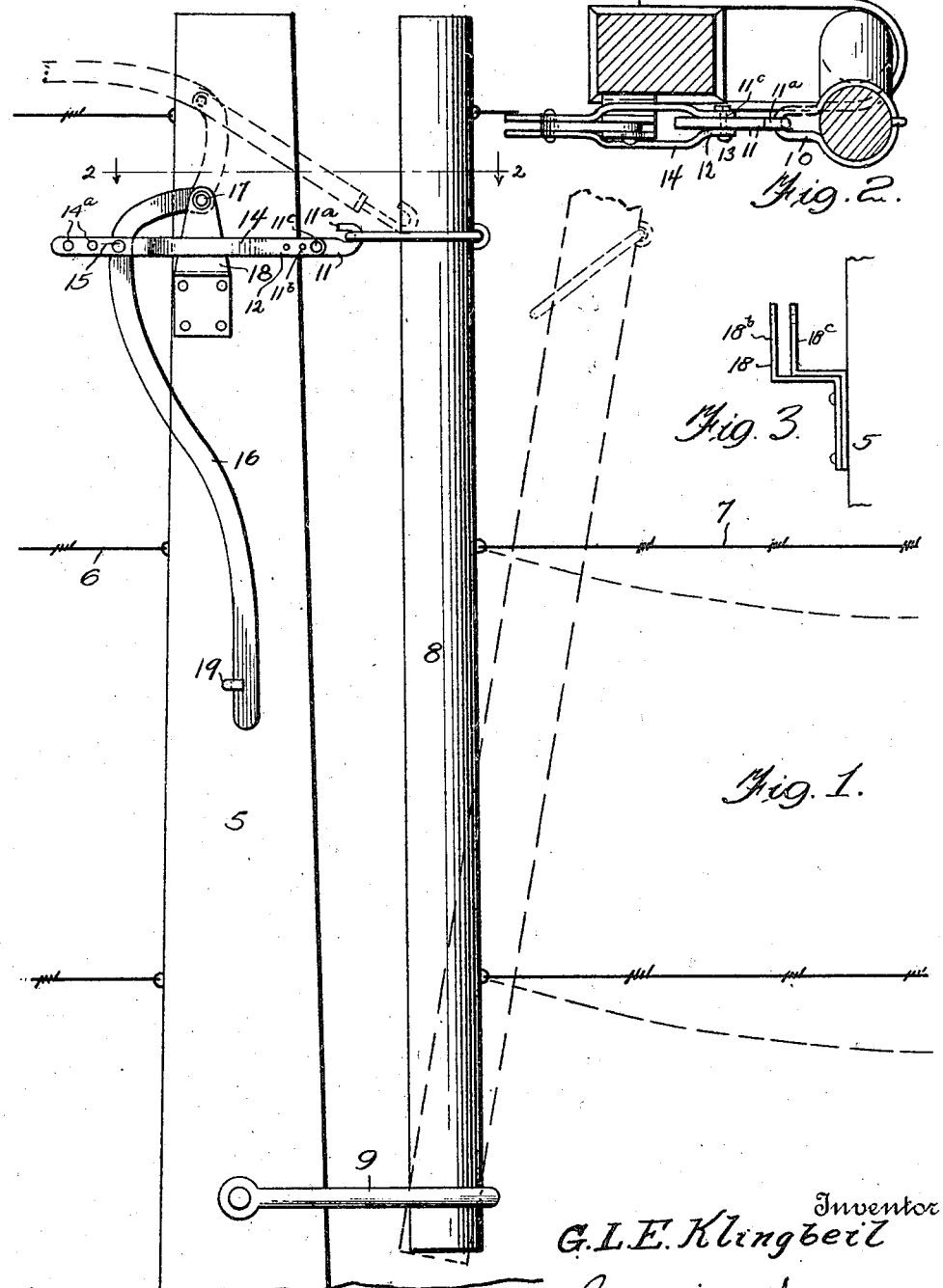

1,486,905

UNITED STATES PATENT OFFICE.

GOTTLIEB L. E. KLINGBEIL, OF OMAHA, NEBRASKA.

BARBED-WIRE-GATE FASTENER.

Application filed March 20, 1923. Serial No. 626,307.

*To all whom it may concern:*

Be it known that GOTTLIEB L. E. KLINGBEIL, a citizen of the United States, residing at Omaha, in the county of Douglas and State of Nebraska, has invented certain new and useful Improvements in Barbed-Wire-Gate Fasteners, of which the following is a specification.

This invention relates to a barbed wire gate fastener and it has for its object to provide a simple and inexpensive device of this nature constructed in such manner that a tension gate of a known type may be readily released or drawn to closed position, the locking arrangement being such that under no circumstances can the device be accidentally released, either by cattle rubbing their heads against it or otherwise.

Further objects and advantages of the invention will be set forth in the detailed description which follows.

In the accompanying drawing:

Fig. 1 is a side elevation of a portion of a fence and gate having the invention applied thereto;

Fig. 2 is a horizontal sectional view upon line 2—2 of Fig. 1; and Fig. 3 is a side view of the bracket.

Like numerals designate corresponding parts in all of the figures of the drawing.

In the drawing 5 designates a gate post to which the strands of wire 6 constituting a barbed wire or other type of wire fence are attached.

Tension gates of the character to which this invention relates commonly consist of wires 7 (though it is manifest that wire mesh may be employed, if desired) and a draw pole 8. In carrying out the invention I provide a yoke 9 of substantial U shape which is adapted to straddle the post adjacent the bottom and this yoke receives the lower end of the draw pole 8. A loop 10 is carried by the draw pole adjacent the upper end thereof and this loop is adapted to be engaged by the end 11ª of a flat hook 11. This hook is secured in varying positions of longitudinal adjustment by a bolt or pin 11ᶜ which passes through any one of a series of openings 11ᵇ found in the front end portions 12 of spaced bars which constitute a yoke 14. This renders it possible to maintain just exactly the desired tension upon the gate both winter and summer and irrespective of the degree of expansion or contraction to which the wires 7 are subjected. The yoke 14 is pivotally connected at 15 to an operating lever 16. This lever is pivoted, in turn, at 17, to a bracket 18, carried by the post 5. In opening the gate the handle 16 is swung over to or beyond the dotted line position illustrated in Fig. 1 and this, in turn, moves the hook 11 enough toward the draw pole to permit of the disengagement of the hook from the loop 10. The lower end of the draw pole 8 may then be disengaged from the yoke 9 and the gate may be opened.

When it is desired to close the gate the lower end of the draw pole 8 is placed in the yoke 9 and then the upper end of this draw pole is moved toward the hook 11, enough to permit of the hook being engaged with the loop 10. When the handle is swung to the full line position illustrated, it is manifest that this draws upon the hook 11 through the yoke 14 and places the draw pole and consequently the wires 7 attached thereto, under tension. Furthermore, it is apparent that when the pivot 15 passes downward beyond the pivot 17, the operating lever 16 will have been moved to a "past center" position. Movement of the parts to "past center" position is limited by the yoke 14 engaging with the left hand edge of the upper part of the bracket 18. Thus there is no tendency whatever for the structure to open. Upon the contrary the tension of the gate tends to hold the handle 16 in closed position. However, if an additional safeguard is desired, a hook 19 may be carried by the post and the tail of the handle 16 may be engaged behind this hook, though manifestly this is not necessary.

I have preferred to construct the bracket 18 as illustrated in Fig. 3. In other words I employ two plates 18ᵇ, 18ᶜ the upper portions of which are spaced apart far enough to permit of the lever 16 lying between them. Furthermore, to provide a wide range of adjustments I provide the yoke 14 with a plurality of openings 14ª, for the reception of the pivot 15.

It is to be understood that the invention is not limited to the precise construction set forth but that it includes within its purview whatever changes fairly come within either the terms or the spirit of the appended claims.

Having described my invention what I claim is:

1. A device of the character described comprising a bracket adapted to be attached to a gate post, a lever the end of which is pivoted to said bracket, a yoke pivoted to said lever and adapted to embrace said bracket and engageable with said bracket in one direction to limit the movement of said yoke, a hook passing through said yoke, means for adjusting the position of the hook with respect to the yoke, a draw pole, a loop upon the draw pole adapted to be engaged by said hook and means at the bottom of the gate post for engaging the lower end of the draw pole.

2. A device of the character described comprising a post carried bracket, a lever pivoted thereto at its end, a yoke, means for connecting one end of said yoke to said lever at a plurality of points in the length of the yoke, a hook, means for adjusting the hook longitudinally with respect to the yoke, a draw pole and a loop carried by the draw pole with which the said hook is adapted to engage.

3. A device of the character described including a bracket adapted to be attached to the side of a gate post and comprising an offset upper end, an operating lever having an angular upper end pivoted to the offset portion of said bracket, a yoke comprising a pair of spaced bars, said lever lying between the rear end portions of said bars and being pivotally connected thereto by a member which traverses the said bars and said lever, said bars being provided with a plurality of openings for the reception of said member whereby the point of attachment of the yoke to the lever may be varied, a hook lying between the forward end portions of the bars and a member traversing said hook and said bars, said bars being provided with a plurality of openings for the reception of said member whereby the position of the hook may be adjusted longitudinally with respect to said bars, that portion of the yoke between the point of attachment of the lever and the point of attachment of the hook being bowed outwardly to form an enlarged portion which embraces the upper part of the bracket, a draw pole, a plurality of strands of wires attached to draw pole and a loop carried by said draw pole and adapted to engage said hook.

In testimony whereof he affixes his signature in the presence of two witnesses.

GOTTLIEB L. E. KLINGBEIL.

Witnesses:
 IDA SHAFTON,
 MAUDE C. SHEPARD.